United States Patent [19]
Possati

[11] 3,842,545
[45] Oct. 22, 1974

[54] CONTROL METHOD AND APPARATUS FOR A MACHINE IN PARTICULAR FOR A GRINDING MACHINE

[75] Inventor: Mario Possati, Bologna, Italy

[73] Assignee: Finike Italiana Marposs, Bentivoglio, Italy

[22] Filed: Dec. 6, 1972

[21] Appl. No.: 312,758

[30] Foreign Application Priority Data
Dec. 7, 1971   Italy .................................. 3585/71

[52] U.S. Cl .......... 51/165.71, 51/165.77, 51/165.91
[51] Int. Cl .............................................. B24b 49/02
[58] Field of Search ........ 51/165 R, 165.71, 165.77, 51/165.88, 165.91

[56] References Cited
UNITED STATES PATENTS

| | | | |
|---|---|---|---|
| 2,678,500 | 5/1954 | Foster | 51/165 R |
| 3,440,771 | 4/1969 | Temple | 51/165 R |
| 3,456,394 | 7/1969 | Welsh | 51/165.77 |
| 3,699,720 | 10/1972 | Lenning | 51/165.77 |

*Primary Examiner*—Al Lawrence Smith
*Assistant Examiner*—James G. Smith
*Attorney, Agent, or Firm*—Stevens, Davis, Miller & Mosher

[57] ABSTRACT

A method and apparatus for improving the speed of operation of a machine tool wherein a given dimension of a workpiece being machined is continuously measured, the signal representing the measured dimension being supplied to the machine tool control apparatus; this measured value is also compared with a preset reference value representing the given dimension at a time prior to completion of machining; the current machining speed is also calculated from the measured dimension. When the measured value of the dimension equals the reference value, the measuring means is moved out of engagement with the workpiece and the amount of machining is thereafter calculated on the basis of the last machining speed calculated just prior to the disengagement of the measuring means; the calculated machine amount is then compared with the reference value and the difference therebetween is supplied to the machine tool control apparatus.

8 Claims, 4 Drawing Figures

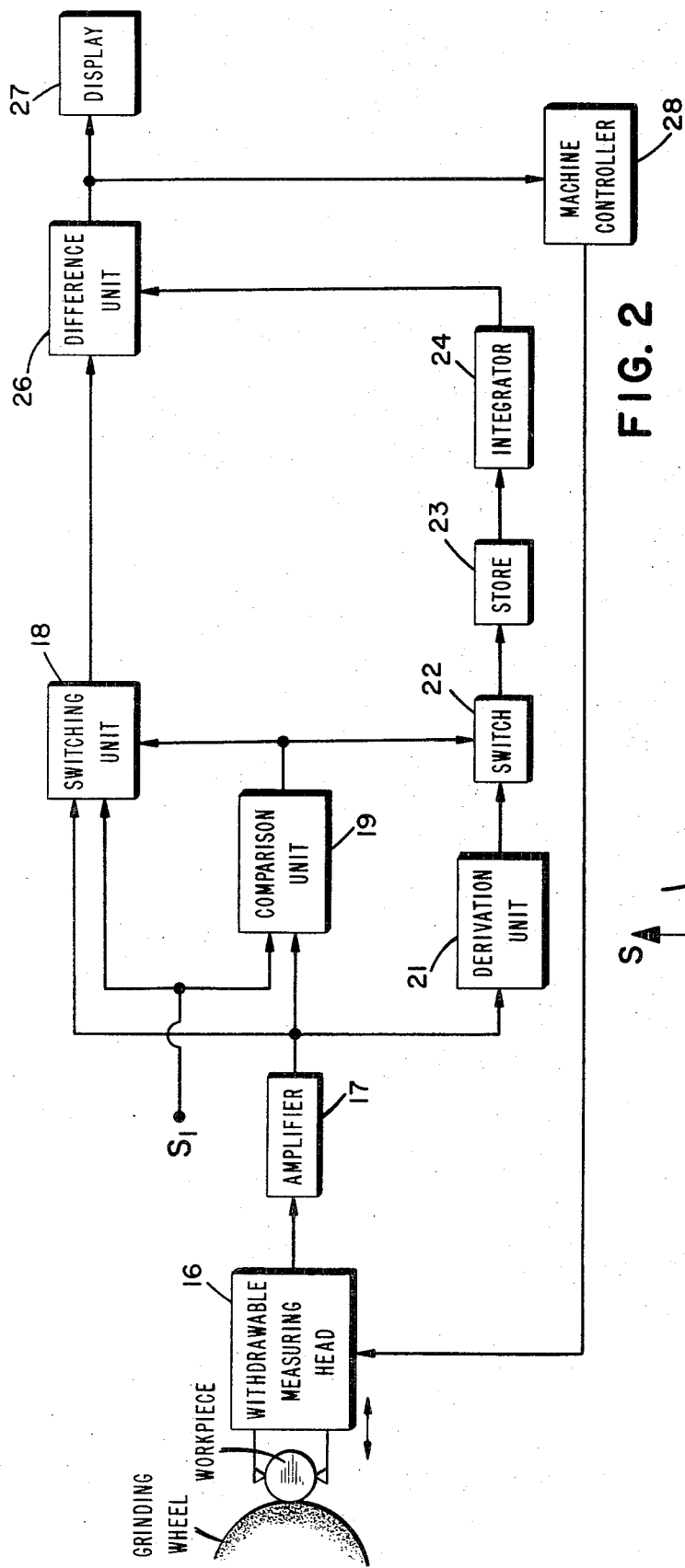
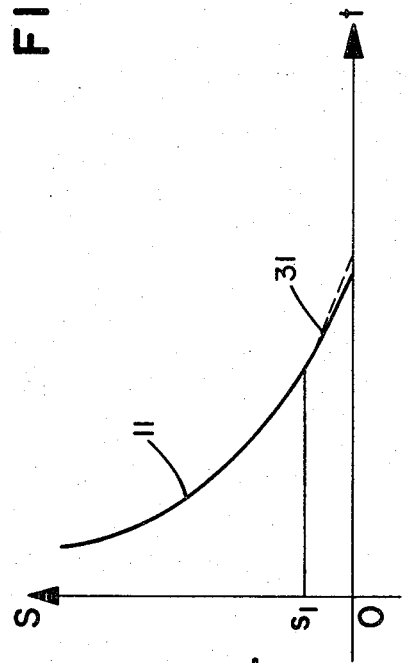
FIG. 2
FIG. 1

CONTROL METHOD AND APPARATUS FOR A MACHINE IN PARTICULAR FOR A GRINDING MACHINE

The present invention relates to a control method for a machine tool using a measuring instrument which determines the dimensions of the workpiece being machined. The method is suitable for grinding machines with automatic loading and discharge of the workpiece.

Generally control is carried out in such a manner as to interrupt the grinding of the workpiece when the measuring instrument indicates that the workpiece being machined has reached the required dimensions. At this point the instrument is withdrawn, the machined piece is discharged and a new piece is loaded. The two operations of withdrawing the measuring instrument and discharging the workpiece cannot generally take place at the same time because there is interference between the parts in motion.

In modern high production rate machines, this idle time constitutes a rather high percentage of the time taken for the complete machining cycle and is thus unacceptable.

A technical problem which the present invention proposes to resolve is to provide a measuring method which enables the aforementioned idle time to be eliminated.

According to the invention there is provided a control method for a machine tool using a measuring instrument which determines the dimensions of the workpiece being machined, consisting of withdrawing the measuring instrument from the workpiece before the completion of the machining cycle at a predetermined point, determining the law of variation of the signal from the measuring instrument in the proximity of the moment of withdrawal of the measuring instrument, then generating a signal which varies according to a law analogous to that determined for the signal originating from the measuring instrument, said signal controlling the machine tool until the completion of machining.

The following description illustrates a preferred embodiment of the invention, given by way of non-limiting example with reference to the accompanying drawings in which:

FIG. 1 is a diagram illustrating a plunge machining cycle of the machine tool with continuous measurement of the workpiece;

FIG. 2 is a block diagram of a control device operating on the basis of the method according to the invention;

Figure 4:
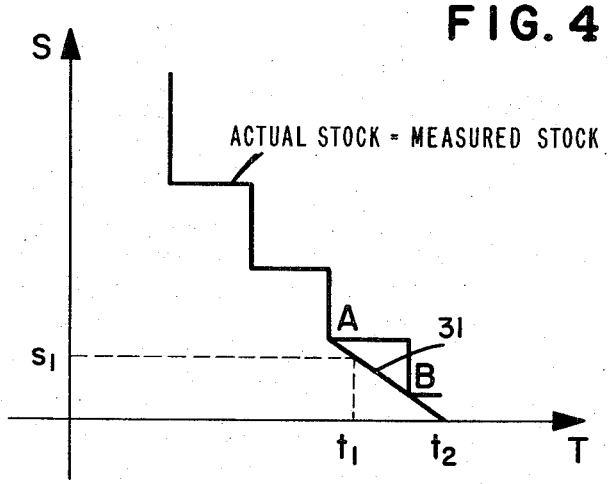
FIG. 4 is a diagram which illustrates a step machining cycle.

Referring particularly to a grinding machine which operates according to the plunge method (FIG. 1), and reproducing the machining cycle on a cartesian diagram in which the abscissa represents machining times $t$ and the ordinate represents the stock $S$ progressively removed by the grinding wheel of the grinding machine, this cycle can be represented by a curve 11 which progressively descends until it cuts the time axis, i.e., the straight line $S = 0$. The control for the termination of machining and hence for the return of the grinding wheel must be given when at said point of cutting the axis.

On the basis of the method according to the invention the control for withdrawing the measuring instrument is given when the stock has a predetermined value $S_1$ and the cycle is continued until reaching $S=0$ by means of a control programme for the cycle itself.

The control is effected by a measuring head 16 arranged to continuously determine the dimensions of the workpiece being machined and to indicate the stock $S$ which is still to be removed.

The signal $E$ at the outlet of the measuring head 16 is fed to an amplifier 17 and then to a switching unit 18 which also receives a signal $E_1$ corresponding to a preset adjustable value $S_1$ of the stock.

The signal $E$ at the output of the amplifier 17 and the signal $E_1$ are also applied to a comparison unit 19 which emits a suitable signal when the signal $E$ from the amplifier 17 is equal to the preset signal $E_1$. This signal controls the switching unit 18.

The signal $E$ at the output of the amplifier 17 is finally fed to a derivation unit 21 of a computer stage which calculates at each instant the velocity $V_A$ of removal of the shavings. At the output of the unit 21 there is a commutator or switch 22 also controlled by the signal from the comparison unit 19. The value $V_{A1}$, present at the output of the derivation unit 21 at the moment in which the switch 22 is operated, is stored in a store 23 and then applied to a unit 24 which is fed by way of the store 23 with a zero signal until the signal $E$ is higher than $E_1$ and with a value $V_{A1}$ from the moment in which $E$ equals $E_1$.

This in turn supplies a zero signal until the signal $E$ is greater than $E_1$, and is able to supply a signal which varies with time according to the law $V_{A1} \cdot t$ starting from the moment in which $S=S_1$. The signal at the output of the unit 24 is applied to the negative input of a differential unit 26, to the positive input of which is applied the signal from the switching unit 18. This signal is given by the signal $E$ while $E > E_1$ and by the signal $E_1$ when $E < E_1$. As stated, the commutation is controlled by the comparison unit 19.

Finally the signal at the outlet of the differential unit 26 is applied to display instruments 27 and to a unit 28 for controlling the machine cycle.

The device operates in the following manner.

The measurng head 16 supplies a continuous signal proportional to the stock still to be removed from the workpiece being machined. The signal, suitably amplified by the amplifier 17, is fed through the switching unit 18 and differential unit 26 to the visualisation or display instruments 27 and to the unit 28 controlling the machine. When the signal $E$, corresponding to the stock on the workpiece, reaches the set value $E_1$, the comparison unit 19 emits an impulse which results in the operation of the switching unit 18 and switch 22.

Following this operation the switching unit 18 supplies the fixed signal $E_1$ at its output, and the switch 22 permits the passage and storage in the store 23 of the signal $V_{A1}$, i.e., the velocity of removal of the stock at the moment in which $S=S_1$.

In this manner the unit 24 starts to generate the signal $V_{A1} \cdot t$ and applies it to the differential unit 26 which from this moment has an output signal given by $E_1 - V_{A1} \cdot t$. The instruments 27 and control unit 28 are from this moment controlled on the basis of this signal. The withdrawal of the measuring instrument is carried out at this moment.

The signal $E_1-V_{A1}\cdot t$ on the diagram of FIG. 1 can be represented by a straight line 31 tangential to the curve 11 at the point $S=S_1$. As the end of the curve 11 approximates fairly well to a straight line, the point where the curve 11 and straight line 31 meet the axis $S=0$ substantially coincide. The error which is introduced by interrupting the machining cycle on the basis of the simulated curve 31 is hence in practice unappreciable. It is evident that by taking into account the acceleration, i.e., the derivative according to the curve 11 at the point $S=S_1$, this error may be further reduced, and that by introducing the derivatives of still higher order the curve may be approximated as far as is required.

From the aforegoing it is evident that the control method according to the invention enables the measuring head 16 to be withdrawn from the workpiece before the termination of machining at a suitable moment in which there is still stock $S_1$ to be removed. This moment is chosen in such a manner that the approximation attainable by substituting the straight line 31 for the curve 11 is acceptable. When the workpiece reaches the desired size, i.e., when $S=0$, it can be immediately discharged because the measuring head 16 has already been withdrawn.

Evidently the applications of the method and apparatus according to the invention are not limited to those heretofore described.

Figure 3:
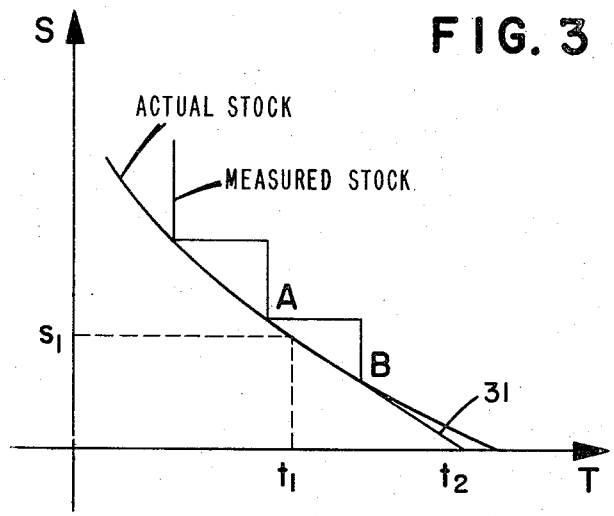
FIG. 3 is a diagram which illustrates a plunge machining cycle with discontinuous measurement of the workpiece.

The invention may also be used for plunge machining in which the measurement is made discontinuously (FIG. 3) or for step machining (FIG. 4). In these cases the measuring instrument is still withdrawn when it determines an amount of stock less than a set value of $S_1$ and machining is continued using a control signal corresponding to the straight line joining the last updated points of measurement A, B, determined by the measuring instrument.

This method thus results in a definite increase in the productivity of the machine without negatively affecting its precision.

With modern machine tools of a high production rate, the saving in time obtained may be of the order of 10–15 percent of the complete cycle.

What we claim is:

1. A method for use with a machine tool apparatus having means for machining a workpiece and means for measuring the dimensions of the workpiece being machined comprising:

generating a measurement signal depending on the dimensions of the workpiece being machined;

controlling withdrawal of the measuring means at a point of the machining cycle before said measurement signal reaches the value corresponding to the required final dimensions of the workpiece;

processing the values of the measurement signal generated at the time of withdrawing the measuring means, for generating a control signal varying thereafter with a law analogous to that of said values of the measurement signal generated at the time of withdrawing;

utilizing said control signal for automatically controlling the completion of the machining of the workpiece.

2. A method for use with a machine tool apparatus having means for machining a workpiece and means for measuring the dimensions of the workpiece being machined, comprising:

generating a measurement signal responsive to the dimensions assumed by the workpiece during the machining;

processing said measurement signal for obtaining a signal responsive to the rate of stock removal from the workpiece;

comparing said measurement signal with a preset value corresponding to a dimension of the workpiece different from the required final dimension to be attained by the machining;

automatically controlling the detecting of the value of the signal responsive to the rate of stock removal when said measurement signal reaches a value corresponding to said preset value;

generating a control signal varying with a rate equal to that detected at the preceding step;

utilizing said control signal for automatically controlling the completion of the machining of the workpiece.

3. The method according to claim 2, further comprising the step of automatically controlling the withdrawal of said measuring means prior to the completion of the machining of the workpiece.

4. The method according to claim 3, wherein the withdrawal of the measuring means is controlled when the measurement signal reaches a value at least equal to said preset value.

5. The method according to claim 2, further comprising the step of automatically interrupting the machining of the workpiece as soon as the generated control signal reaches a value corresponding to the required final dimension of the workpiece.

6. The method according to claim 2, wherein the measurement signal, the preset value, the signal responsive to the rate of stock removal and the control signal are electrical quantities and wherein generating and utilizing said control signal comprise the further steps of:

electrically storing said detected value of the signal responsive to the rate of stock removal;

electrically integrating this detected value with respect to the time;

electrically subtracting the signal produced by the last step from the preset value;

utilizing the electrical signal resulting from the last step for automatically controlling the completion of the machining of the workpiece.

7. Apparatus for use with a machine tool comprising:

measuring means for measuring a workpiece by providing a measurement signal depending on the workpiece dimension;

machine controlling means connected with said measuring means for controlling the machining cycle by said measurement signal;

switch means adapted to disconnect said machine controlling means from said measuring means;

comparison means coupled to the output of said measuring means for comparing said measurement signal with a preset value and for operating said switch means when the measurement signal reaches the preset value;

processing means connected with said measuring means and comparison means and adapted to generate, after the operation of said switch means, by the comparison means a control signal varying with a law analogous to that of the measurement signal at the time of said operation of the switch means, the output of the processing means being coupled to said machine controlling means for controlling the machining cycle after the operation of the switch means.

8. The apparatus according to claim 7, wherein said processing means comprises:

a derivative circuit connected with said measuring means for providing an output signal responsive to the derivative of the measurement signal;

further switch means connected to said comparison means and adapted to be operated when the measurement signal reaches said preset value;

store means connected with said derivative circuit through said further switch means for receiving and storing the output of the derivative circuit at the time of the operation of said further switch means;

integrating means connected with said store means for integrating the output thereof after said operation of the further switch means; and difference means adapted to receive said preset value and the output of the integrating means for providing said output control signal for controlling the machine tool after said measurement signal has reached said preset value.

* * * * *

UNITED STATES PATENT OFFICE
CERTIFICATE OF CORRECTION

Patent No. 3,842,545          Dated October 22, 1974

Inventor(s) Mario POSSATI

It is certified that error appears in the above-identified patent and that said Letters Patent are hereby corrected as shown below:

[73] Assignee should read, -- FINIKE ITALIANA MARPOSS-Societa in Accomandita Semplice di Mario Possati & C. --

Signed and sealed this 11th day of February 1975.

(SEAL)
Attest:

RUTH C. MASON
Attesting Officer

C. MARSHALL DANN
Commissioner of Patents
and Trademarks